A. L. & A. S. FOLGER.
Evaporator.
No. 226,395.  Patented April 13, 1880.
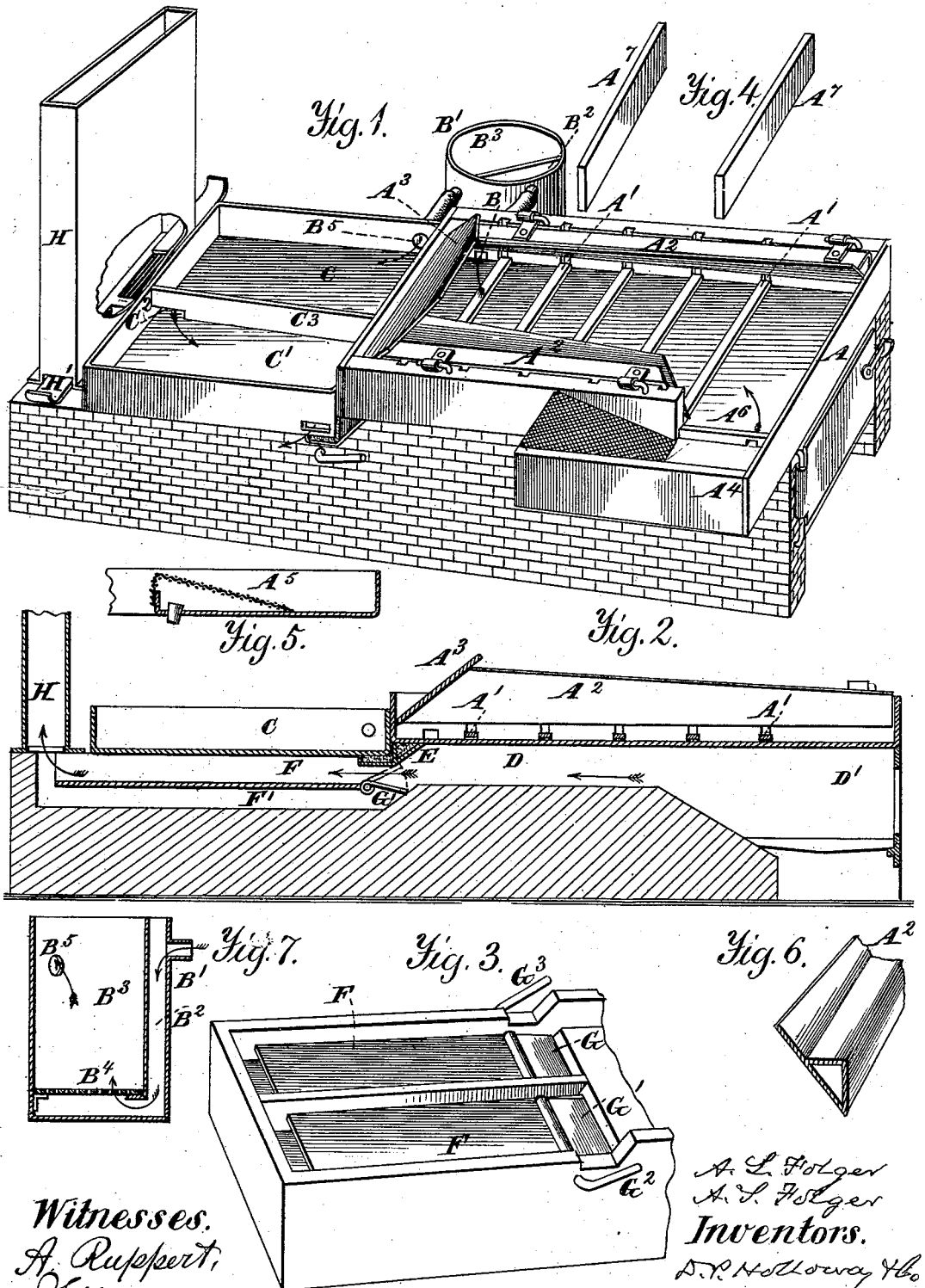

UNITED STATES PATENT OFFICE.

ADDISON L. FOLGER, OF SUMNER, INDIANA, AND A. SMITH FOLGER, OF WASHINGTON, IOWA.

EVAPORATOR.

SPECIFICATION forming part of Letters Patent No. 226,395, dated April 13, 1880.

Application filed August 18, 1879

*To all whom it may concern:*

Be it known that we, A. SMITH FOLGER, of Washington, county of Washington, and State of Iowa, and ADDISON L. FOLGER, of Sumner, in the county of Rush and State of Indiana, have invented certain new and useful Improvements in Evaporators; and we do hereby declare that the following is a full, clear, and exact description of our invention, which will enable others skilled in the art to which it appertains to make and use the same, reference being had to the accompanying drawings, and to letters of reference marked thereon, which form a part of this specification.

Figure 1 is a plan view, partly in perspective, of our improved apparatus, showing the evaporating-compartments, the hinged scum collectors and directors, the hot filter, the finishing-compartments, and a portion of the uptake of the furnace. Fig. 2 is a sectional elevation, showing the furnace, dampers for directing the products of combustion, and a guard for preventing the heat from coming in contact with the ends of the finishing-compartments. Fig. 3 is a detached view of a portion of the flues through which the heat and products of combustion pass while in contact with the under surface of the finishing pans or compartments and dampers for controlling such passage, it being in perspective. Fig. 4 shows, in perspective, cross bars or plates which are used to form partitions in the first evaporating pan or compartment. Fig. 5 is a detached view of a scum-receiver, upon which the matter to be skimmed off collects, and showing also a portion of the casing of the evaporating-pan. Fig. 6 is a detached view of a portion of one of the hinged scum-directors attached to the first evaporating-compartment, it being in perspective; and Fig. 7 is a sectional elevation of the hot filter, showing the receiving-compartment, the false bottom, and the discharge-orifice.

Corresponding letters denote like parts in all of the figures.

This invention relates to that class of devices which are used for the evaporation of sorghum-juice and other saccharine substances, and which are automatic in their operation so far as relates to the collection of the material to be skimmed off and its direction to a certain spot; and it consists, first, in combining with the first evaporating-compartment of such an apparatus hinged or adjustable scum collectors and directors, arranged as hereinafter described, whereby they are made to collect the material which rises to the surface of the juice while undergoing evaporation in the first compartment and direct it to a point where it may be readily removed; secondly, it consists in combining with the first and second or finishing compartments of an evaporating apparatus a hot filter having separate compartments, a false bottom, and being supplied with a filtering substance; and, lastly, it consists in the employment of a dividing-plate placed in the flue, whereby the heated products of combustion are prevented from impinging with too much force against the point where the first and second evaporating-pans meet.

In constructing an apparatus of this character we form a pan or compartment, A, of iron, copper, or other suitable material, and of such dimensions as are required by the work to be done. This pan is open on top, its sides being of such height as to cause it to hold the required amount of juice to be evaporated. Across its bottom and upon its inner surface ledges A' A' are placed, they being soldered or otherwise firmly attached thereto, so as to cause them to form strengthening-ribs for said bottom, and at the same time arrest the movements of the solid portions of the substance under treatment and cause them to settle into the spaces between the ledges, in doing which they will be prevented from passing out into the filter, and at the same time tend to prevent the juice from being burned.

For the purpose of collecting the scum or substance which rises to the surface of the material while undergoing evaporation in its first stage and directing it to a point where it may be readily removed, we place upon the upwardly-projecting sides of the pan hinged adjustable guides $A^2$ $A^2$, which are so constructed and arranged that they may be turned inward, as shown in Fig. 1, their rear ends being covered by a sliding and tilting plate, $A^3$, as there shown, in which positions these parts will form skimmers or collectors of the scum, and will direct it to the front of the pan, where it will pass out through an aperture formed in the side thereof into an auxiliary pan, A⁴, formed thereon for its reception. While the scum is being directed to the front part of the compartment A and into the auxiliary pan A⁴ the valuable portions of the juice will be caused by the heat under the pan to travel to the rear thereof, from which it is taken off into a filter, soon to be described.

The generation of steam under the inwardly-projecting portions of the hinged directors, together with the well-known fact that the scum rises to a higher level at the rear of the pan than at the front, serves to put said scum in motion and to cause it to be carried forward and into the auxiliary pan A⁴, which, at its rear end, is provided with a strainer, A⁵, made of fine wire-gauze or of perforated metal. From this strainer the scum can be readily removed by any instrument adapted for the purpose, and any of the juice which passes through said strainer can be drawn off through an aperture formed in the bottom thereof, or it can be allowed to flow back into the pan A through a slot formed in the dividing-bar A⁶, as shown by the arrow in Fig. 1.

It sometimes becomes desirable to use the pan A as an evaporator after all the scum has been removed from the material, in which case the directors A² A² are turned outward and partitions A⁷ A⁷ are inserted into grooves formed in the side wall of compartment A, said ledges being provided with suitable packing to prevent the leaking past them of the juice, which is passed from one space to the other by ladles, and is thus evaporated to any desired degree of consistency before being permitted to pass out into the filter.

When the juice has been sufficiently evaporated and cleansed in the apartment A, and as it reaches its rear end, it is allowed to flow out thereof through an aperture, B, which may, if desired, be controlled by a cock or valve, and into the filter B', which is divided into two compartments, B² and B³. The former, being the smaller of the two, is the one into which the juice is received from the pan A, and from which it passes, through a perforated bottom, B⁴, into the larger compartment. Upon this perforated bottom or plate there is placed any suitable filtering substance, up through which the juice passes to the upper portion of compartment B³, and out of which it flows, through a pipe, B⁵, into the second or finishing pans or compartments, C C', which are placed in rear of the first compartment, A, as shown in Figs. 1 and 2 of the drawings. These compartments are separate from the first one, but are arranged to operate in connection therewith, as above described, and also made to utilize the heat that has passed from the first pan, as will soon be shown. In order that the watery vapor arising from the material while in these pans may pass off freely, they are left open at top, and are so arranged that said material enters at the forward end of compartment C and travels to the rear portion thereof before it can escape into compartment C', which it does through an opening, C², formed in the partition C³, which divides the compartments, from which point it travels to the front end of C', where it may be drawn off.

For the purpose of preventing the heat from impinging with too much force against the front ends of the pans C and C', there is placed across the throat of the flue D, which leads from the furnace D', where the fuel is burned, (which may be of any approved form,) a plate of metal, E, substantially of the form shown in Fig. 2, it being so constructed as to contain some non-conducting material, which will keep the heat from the ends of the pans, and at the same time direct it downward to the flues underneath them.

As it is of great importance that the operator of this device should be able to control the amount of heat which is allowed to come in contact with the pans C C', there are placed at the front end of the flues or passages F F' dampers G G', each being capable of separate operation by means of handles G² and G³, which are attached to rods which pass through the walls of the furnace and upon which the dampers are secured. Under each of the pans there are formed two separate and distinct flues or passages, F and F', one directly above the other, and the dampers G and G' are so arranged that the heated products of combustion can be all turned through the passages F, and so into direct contact with the under surfaces of the pans C C', or it can all be turned into the passages F' F', and thus kept from such contact; or by placing the dampers in a horizontal position a part of the heat will be allowed to pass through each of the flues or passages. It is also apparent that the arrangement of dampers is such that one of them can be placed in such a position as to direct the heat into contact with one of the pans, while the other one is so adjusted as to throw all or a part of the heat away from the other pan. This arrangement is of great importance when one of the pans is used as a means of finishing the operation upon the substance being treated, as it is well known that said substance requires less heat for its proper treatment when it has been brought near to its finished condition than at any other time, as it is more liable to be injured by heat then than it is in the earlier stages of the process.

As a means of regulating the draft of the furnace, we place at the lowest point of the uptake H a sliding damper, H', which controls the passage of the products of combustion from the flues or passages F F' to said uptake, and by which the amount of air admitted to the furnace D' can be controlled.

We are aware that it is not novel, broadly, to employ two or more evaporating-compartments in an evaporating apparatus, such being shown in the patents of Caleb Bond, of July 12, 1866, George Stephenson, of November 10, 1863, and F. Michael, of October 1, 1878; and hence we do not claim, broadly, such devices; neither do we claim the combination of them otherwise than substantially as set forth in our specification and claims.

We are also aware that it is not novel, broadly, to regulate the amount of heat that shall be allowed to come in contact with the different compartments of an evaporator, an arrangement of dampers for such a purpose being shown in the patent of Caleb Bond of July 12, 1866. We do not, therefore, claim, broadly, such an arrangement; but,

Having thus described our invention, what we claim, and desire to secure by Letters Patent, is—

1. In combination with a pan or compartment in which the first stage of the evaporation of saccharine matter is carried on, the hinged adjustable scum collectors and directors $A^2 A^2$, substantially as and for the purpose set forth.

2. In combination with the first evaporating-compartment, A, and with the second or finishing compartments, C C′, a filter, B, having in it a partition for dividing it into two apartments, said filter being connected with the compartments A and C by pipes located mainly below the level of the pans, whereby the juice is caused to flow from A to C automatically, as set forth.

3. In combination with the evaporating-pans A and C C′, the metal plate E, and non-conducting substance inclosed thereby, substantially as and for the purpose set forth.

In testimony that we claim the foregoing as our own invention we affix our signatures in the presence of two witnesses.

A. SMITH FOLGER.
ADDISON L. FOLGER.

Witnesses to signature of A. Smith Folger:
A. VAN WAGENER,
C. H. WILSON.

Witnesses to signature of Addison L. Folger:
ALFRED B. FLINN,
JOHN FLEEHART.